United States Patent
Chan et al.

(10) Patent No.: US 8,659,689 B2
(45) Date of Patent: Feb. 25, 2014

(54) FAST MEASUREMENT OF ALIGNMENT DATA OF A CAMERA SYSTEM

(75) Inventors: Danny Chan, Berlin (DE); Juergen Hausmann, Filderstadt (DE); Nedzad Halkic, Filderstadt (DE)

(73) Assignee: RPX Corporation, San Francisco, CA (US)

( * ) Notice: Subject to any disclaimer, the term of this patent is extended or adjusted under 35 U.S.C. 154(b) by 251 days.

(21) Appl. No.: 13/068,633

(22) Filed: May 17, 2011

(65) Prior Publication Data

US 2012/0293670 A1    Nov. 22, 2012

(51) Int. Cl.
*H04N 3/14*    (2006.01)
*H04N 5/335*    (2011.01)

(52) U.S. Cl.
USPC ............ 348/294; 348/298; 348/302; 348/308

(58) Field of Classification Search
USPC .............. 348/294–324, 208.99, 208.1–208.8, 348/208.11–208.16; 396/89
See application file for complete search history.

(56) References Cited

U.S. PATENT DOCUMENTS

| | | |
|---|---|---|
| 6,628,339 B1 | 9/2003 | Ferland et al. |
| 2006/0108518 A1 | 5/2006 | Lee et al. |
| 2007/0071429 A1* | 3/2007 | Woehler .......................... 396/89 |
| 2008/0246873 A1 | 10/2008 | Kinoshita |

* cited by examiner

*Primary Examiner* — Yogesh Aggarwal
(74) *Attorney, Agent, or Firm* — Howison & Arnott, LLP

(57) ABSTRACT

Methods are disclosed for digital cameras to gain tilt information of an image sensor of the camera in order to achieve a fast correction for this tilt. By moving the lens of the camera to positions providing a maximum sharpness of at least three regions of interest (ROI) in the image sensor the tilt of the image sensor is calculated by using the correspondent lens/sensor distances and the distances of the different ROIs to the center of the image sensor. Yaw and pitch values of the tilt of the image sensor are calculated to enable an alignment of the sensor.

13 Claims, 2 Drawing Sheets

FAST MEASUREMENT OF ALIGNMENT DATA OF A CAMERA SYSTEM

BACKGROUND OF THE INVENTION (1) Field of the Invention

This invention relates generally to digital cameras and relates more specifically to alignment of camera modules and measurement of sharpness distribution.

(2) Description of the Prior Art

Alignment of camera modules is often done using iterative approaches where alignment steps and measurements of the sharpness distribution are performed and iteratively refined until an optimum is found. Measurement of the sharpness distribution can be done either by visual inspection by a human operator or by time consuming objective measurements like Module Transfer Function (MTF) measurements. MTF is the spatial frequency response of an imaging system or a component; it is the contrast at a given spatial frequency relative to low frequencies. This is a time consuming process that should ideally be shortened for production systems.

It is a challenge to accomplish an optical adjustment of cameras with automatic equipment combined with a real time display of values during adjustment.

Solutions dealing with adjustment of cameras are described in the following patents:

U.S. Patent (U.S. Pat. No. 6,628,339 to Ferland et al.) teaches a digital camera having an image sensor and a lens defining an optical axis for focusing an image upon a focal plane, an image sensor mount includes the digital camera having a housing for mounting the lens and defining a first opening through which an image can be focused by the lens and transmitted along the optical axis, and an image sensor assembly including the image sensor attached to an image sensor mounting plate. The image sensor mount further includes a camera mounting plate having first and second surfaces, the first surface being fixedly attached to the camera housing and defining a second opening through the first and second surfaces which is aligned with the first opening, the camera mounting plate including at least three spaced-apart alignment elements on the second surface, the alignment elements being located at a predetermined position relative to the lens; and an image sensor mounting plate for attaching the image sensor assembly to the camera mounting plate so that the image sensor mounting plate engages the alignment elements to center the image sensor with respect to the optical axis at the focal plane.

U.S. Patent Publication (US 2008/0246873 to Kinoshita) discloses a camera module including a lens unit which includes a lens and a lens holder holding the lens therein, and an image sensing unit which includes a solid-state image sensor and a transparent lid section which is arranged so as to face the receiving surface of the solid-state image sensor, provided with a space S therebetween. The transparent lid section and the lens are independent of each other, and alignment of the lens with respect to the solid-state image sensor is performed by mounting the lens on the transparent lid section. Thus, it is possible to provide a solid-state image-sensing device having high lens alignment precision with respect to a solid-state image sensor.

U.S. Patent Publication (US 2006/0108518 to Lee et al.) describes a structure for calibrating the alignment between a lens set and an image sensor in the process of packaging such as an electric micro-optic module (EMOM) or compact camera module (CCM) by using a matching structure like sawteeth or V-grooves at contact surfaces or edges. Random variations due to manufacturing process can be averaged out by a plurality of the V-grooves and high precision can be obtained by the present invention.

SUMMARY OF THE INVENTION

A principal object of the present invention is to perform an optical adjustment of cameras with automatic equipment Another principal object of the present invention is to achieve a real time display of camera alignment measurement values during alignment.

A further object of the present invention is to achieve a simple and fast method for calculating image sensor and lens misalignments.

A further object of the present invention is to perform an alignment having a strong relation to a visible image.

A further object of the present invention is to perform a stable alignment of cameras by achieving less sensitivity to noise and relative illumination.

A further object of the present invention is to perform an alignment of cameras by achieving less sensitivity to absolute target position.

In accordance with the objects of this invention a method for cameras to gain tilt information of an image sensor of a camera in order to correct for this tilt has been achieved. The method invented firstly comprises the steps, firstly: (1) providing a digital camera module comprising a movable lens and an image sensor, and a measurement device, (2) performing an autofocus operation on the center of the image field, and (3) performing a sweep of the lens position around the autofocus position found in previous step. Furthermore the method invented comprises the steps of: (4) measuring sharpness in at least three ROIs of the image field, and (5) tracking the lens positions at which the ROIs selected in previous step reach their maximum sharpness values using sharpness metrics. Finally the method comprises the steps of (6) calculating a tilt of the image sensor using geometric transformation based on the lens positions yielding the maximum sharpness values found in previous step, and (7) correcting the tilt of image sensor based on tilt information found in previous step.

In accordance with the objects of this invention a method for cameras to gain tilt information of an image sensor of a camera in order to correct for this tilt has been achieved. The method invented firstly comprises the steps, firstly: (1) providing a digital autofocus camera module comprising a movable lens and an image sensor, and a measurement device, (2) performing an autofocus operation in at least three ROIs of the image field using the autofocus function of the camera, and (3) tracking the lens positions at which the ROIs selected in previous step reach their maximum sharpness values using sharpness metrics. Furthermore the method comprises (4) calculating a tilt of the image sensor using geometric transformation based on the lens positions yielding the maximum sharpness values found in previous step, and (5) correcting the tilt of image sensor based on tilt information found in previous step.

BRIEF DESCRIPTION OF THE DRAWINGS

In the accompanying drawings forming a material part of this description, there is shown.

DESCRIPTION OF THE PREFERRED EMBODIMENTS

Systems and methods for fast alignment of a lens/image sensor combination of a camera are disclosed.

Figure 1:
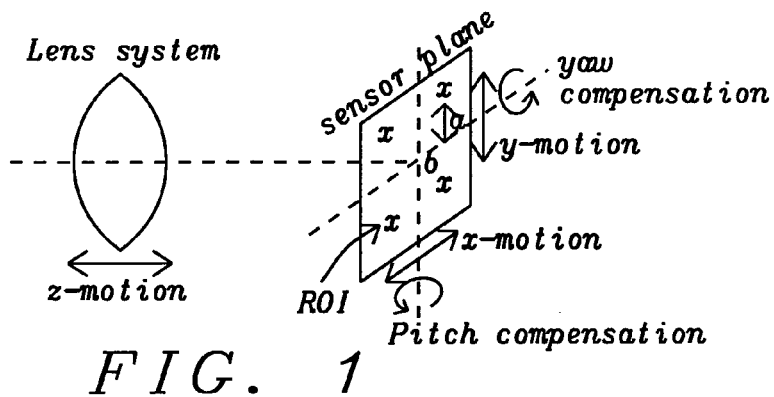
FIG. 1 illustrates a lens/image sensor arrangement inclusive tilt angles and x, y, z coordinates to which the description refers.

FIG. 1 illustrates a lens/image sensor arrangement inclusive tilt angles and x, y, z coordinates to which the following description refers. FIG. 1 shows a lens system 1, which can be aligned by a sweep motion in z-direction along an optical axis of the camera. Furthermore FIG. 1 shows an image sensor 2 for which a relative tilt of the image sensor normal with respect to the lens can be measured in absolute, physical units. This tilt information comprising pitch and yaw information can be used to align the lens (sensor combination.

Fast alignment of a lens/sensor combination allows to compensate both component and assembly tolerances. Preferably, a method for fast alignment will consist of a measurement that determines the relative tilt of the sensor normal with respect to the optical axis of the camera. Given this tilt information, either a human operator or automatic alignment equipment can then correct for this tilt in a single alignment step.

The present invention focuses on the measurement of the relative tilt of the sensor normal with respect to the lens in absolute, physical units.

For the measurement, two approaches are possible which have different tradeoffs in speed and accuracy.

A first embodiment of the present invention consists of an autofocus operation on the center of the image field followed by a sweep of the lens position in z-direction around the found autofocus position. The sweep range is chosen to cover the typical maximal physical tilt observed for the assembly. For each lens position, the sharpness is measured in at least three different corners of the image field. An algorithm tracks the lens positions at which the different corners reach their maximum sharpness values. Given the position of the measurement patches and the z-spacing of the lens positions yielding the maximum sharpness values, the absolute tilt of the sensor with respect to the optical image plane can then be found by simple geometric transformations.

For the geometric transformation a vector is defined for each region of interest (ROI) with a, b defining the x, y distance of the ROIs to the center of the image sensor and z' the best sharpness lens-sensor distance for each ROI relative to the center sharpness position. Then a cross product of the diagonal axis differences is calculated. Taking the cross product result the pitch and yaw compensation values can be calculated. A non-limiting example is shown below:

a=1710 um; b=1282 um

TopLeftVec=[−1710, 1283, −6]; TopRightVec=[1710, 1283, 6];

BottomLeftVec=[−1710, −1283, −3]; BottomRightVec=[1710, −1283, 9], wherein the third value of the vectors above signifies the distance z for each ROI from to the center sharpness position.

TopLeft_BottomRightVec=[−3420, 2566, −15];

TopRight_BottomLeftVec=[3420, 2566, 9];

A cross multiplication of the vectors above yields:

DiagCrossProdVec=[61584, 20520, −17551440];

Using the equations $$yaw = \arctan\left(\frac{DiagCrossProdVec\_x}{DiagCrossProdVec\_z}\right) \text{ and}$$

$$pitch = \arctan\left(\frac{DiagCrossProdVec\_y}{DiagCrossProdVec\_z}\right)$$

the pitch and yaw angles can be calculated:

yaw=−0.201°; pitch=−0.067°

It should be noted that at least three ROIs should be used in order to get the tilt information required.

Different sharpness metrics can be used, for example Sobel values or Standard Deviation values (blur). The Sobel operator is a discrete differentiation operator, computing an approximation of the gradient of the image intensity function.

Experiments using the Blur method have shown measurement times of ≤10 seconds. Assuming that mechanical alignment using automatic equipment takes less than 5 seconds, the total procedure consisting of measurement, alignment and retest should take a time in the range of ~25 seconds.

Both sharpness metrics Sobel and Luminance standard deviations (Blur) deliver comparable results. Since the Blur method doesn't require camera firmware support it is easier to be implemented.

Figure 2:
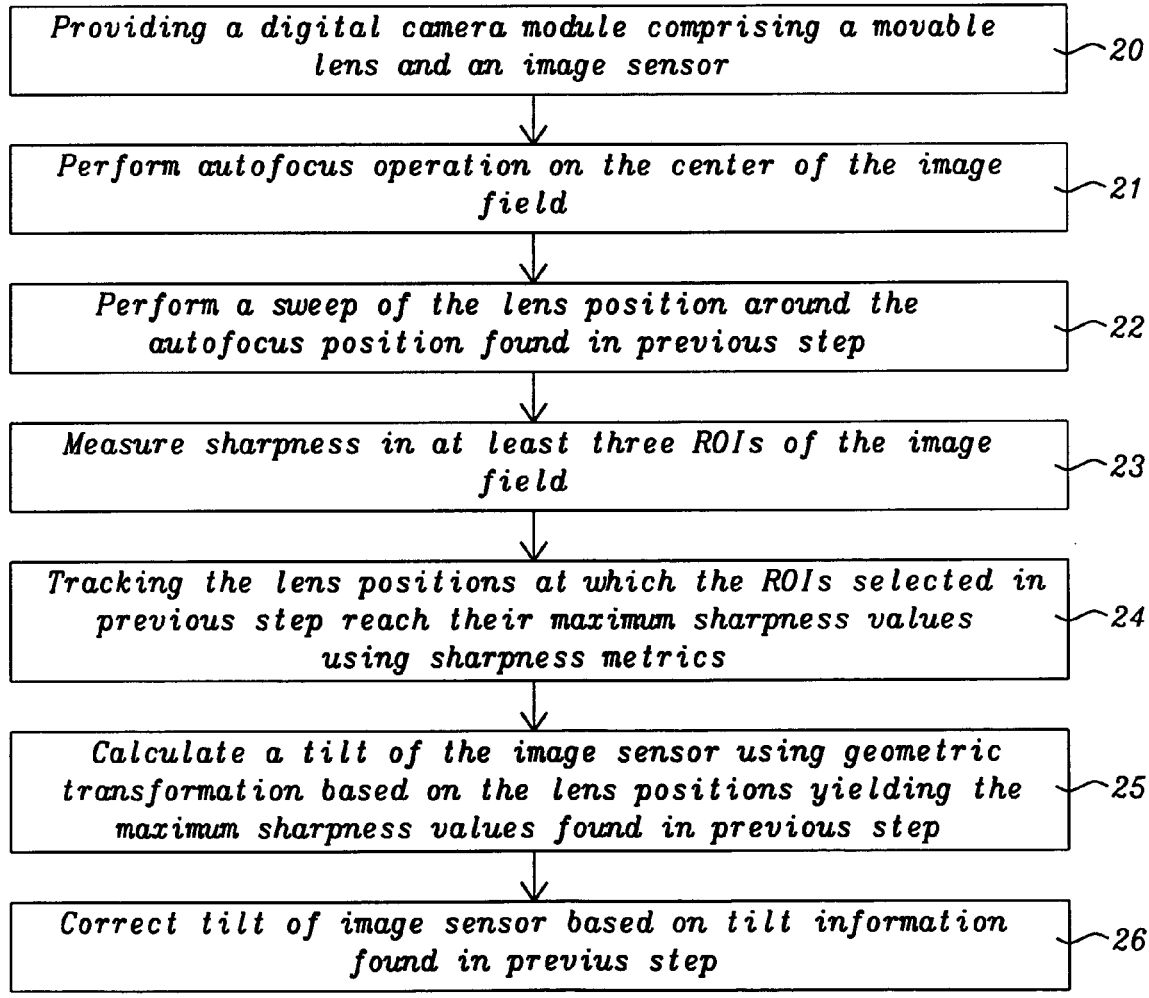
FIG. 2 illustrates a flowchart of the first embodiment of the invention to gain tilt information of an image sensor of a camera in order to correct for this tilt.

FIG. 2 illustrates a flowchart of the first embodiment of the invention to gain tilt information of an image sensor of a camera in order to correct for this tilt. Step 20 describes the provision of a digital camera module comprising a movable lens and an image sensor, and of a measurement device. The next step 21 teaches performing an autofocus operation on the center of the image field, followed by step 22 describing performing a sweep of the lens position around the autofocus position found in previous step: The next step 23 describes measuring sharpness in at least three ROIs of the image field. The following step 24 illustrates tracking the lens positions at which the ROIs selected in previous step reach their maximum sharpness values using sharpness metrics and in step 25 a tilt of the image sensor is calculated using geometric transformation based on the lens positions yielding the maximum sharpness values found in previous step. Finally in step 26 the tilt of image sensor is corrected based on tilt information found in previous step.

A second embodiment of the present invention relies on a fast autofocus algorithm. In this method, the autofocus algorithm is used to find the lens positions with maximum sharpness for each of the measurement patches by positioning the statistics window for the autofocus algorithm at the measurements patches.

In summary, the first embodiment of the invention uses a simple, linear lens motion with more measurement steps whereas the second method utilizes a fast, intelligent autofocus algorithm in combination with the Sobel metrics.

A final sweep method around the interpolated autofocus point may be used to increase accuracy. Assuming an AF time of ≤0.5 seconds, the whole measurement should be finished in ~2 seconds. Minor speed improvements may be used by tracking sharpness statistics for each measurement simultaneously during the AF for one of the measurement patches and using this data to shorten the AF time of the other measurement patches. Assuming 2 seconds for the measurement and the same 5 seconds mechanical alignment time, the whole procedure measurement/alignment/retest should take ~10 seconds.

Figure 3:
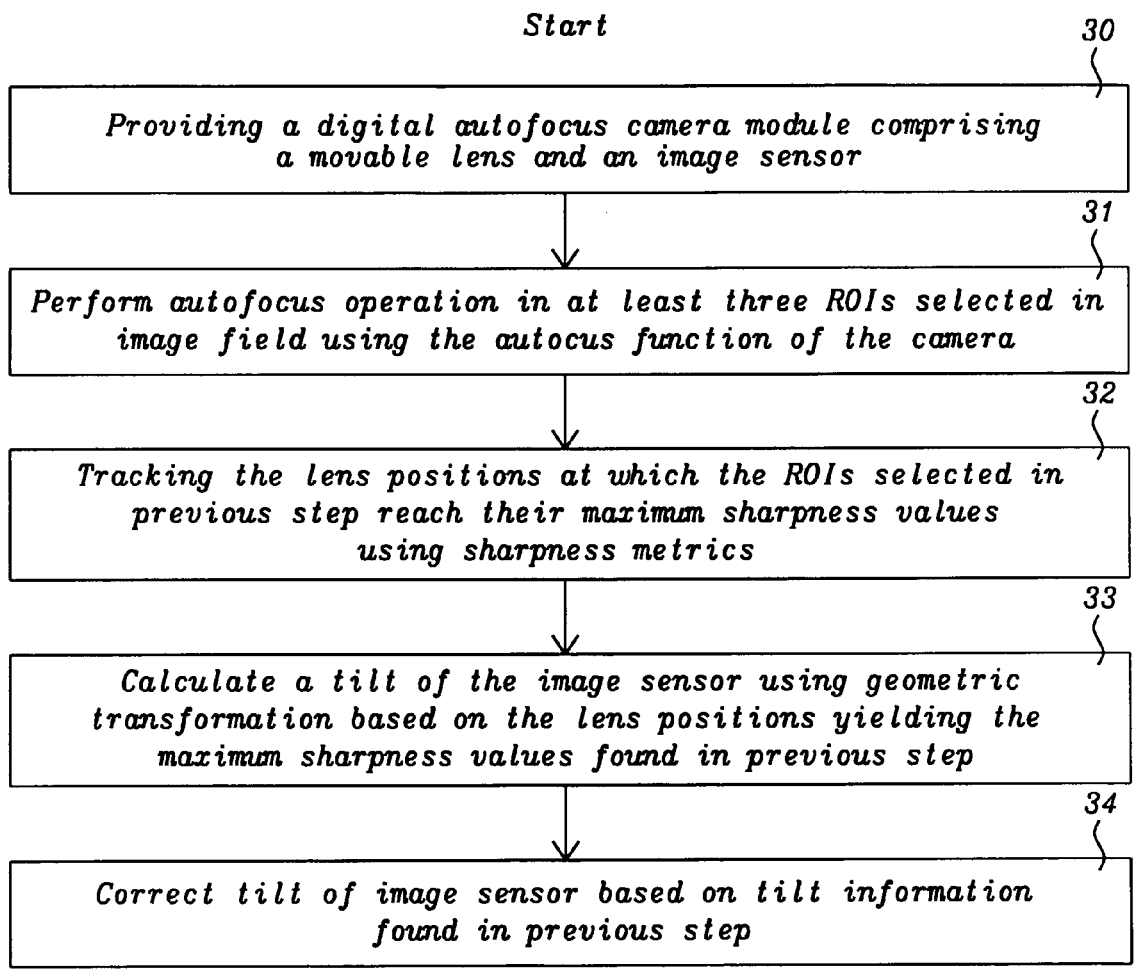
FIG. 3 illustrates a flowchart of the second embodiment of the invention to gain tilt information of an image sensor of a camera in order to correct for this tilt.

FIG. 3 illustrates a flowchart of the second embodiment of the invention to gain tilt information of an image sensor of a camera in order to correct for this tilt. Step 30 describes the provision of a digital autofocus camera module comprising a movable lens and an image sensor. The next step 31 teaches performing an autofocus operation in at least three ROIs of the image field using a autofocus function of the camera; followed by step 32 illustrating tracking the lens positions at which the ROIs selected in previous step reach their maximum sharpness values using sharpness metrics and in step 33 a tilt of the image sensor is calculated using geometric transformation based on the lens positions yielding the maximum sharpness values found in previous step. Finally in step 34 the tilt of image sensor is corrected based on tilt information found in previous step.

After the adjustments are performed a one-frame measurement can be performed in order to ensure that required results have been reached. A personal computer can be used to control the module, run the calculations, and visualize the data. The correction data is transmitted to an alignment system.

Furthermore it should be noted that using a method, which is equivalent to the methods described above, both sensor and lens system can be aligned While the invention has been particularly shown and described with reference to the preferred embodiments thereof, it will be understood by those skilled in the art that various changes in form and details may be made without departing from the spirit and scope of the invention.

What is claimed is:

1. A method for cameras to gain tilt information of an image sensor of a camera in order to correct for this tilt, comprising the following steps:
   (1) providing a digital camera module comprising a movable lens and an image sensor, and a measurement device;
   (2) performing an autofocus operation on a center of an image field;
   (3) performing a sweep of a lens positions around an autofocus position found in previous step;
   (4) measuring sharpness in at least three ROIs of the image field;
   (5) tracking the lens positions at which the ROIs selected in previous step reach their maximum sharpness values using sharpness metrics;
   (6) calculating a tilt of the image sensor using geometric transformation based on the lens positions yielding the maximum sharpness values found in previous step;
   (7) correcting the tilt of the image sensor based on tilt information found in previous step; and
   (8) repeating a one-frame tilt measurement after the image sensor has been aligned.

2. The method of claim 1 wherein a range of said sweep is selected according a typical maximal physical tilt observed.

3. The method of claim 1 wherein said sharpness values are determined using Sobel values.

4. The method of claim 1 wherein said sharpness values are determined using Standard deviation blur values.

5. The method of claim 1 wherein tilt information comprises values of pitch and yaw deviations.

6. The method of claim 1 wherein said geometric transformation comprises:
   (1) defining a vector for each of the ROIs defining a distance between the ROI and the sensor center and defining the best sharpness lens-sensor distance;
   (2) calculate a cross vector product of a diagonal axis differences of the 5 vectors; and
   (3) calculating pitch and yaw angles using the cross vector product results.

7. The method of claim 1 wherein more than one of the ROIs are located in corners of the image sensor.

8. A method for cameras to gain tilt information of an image sensor of a camera in order to correct for this tilt, comprising the following steps:
   (1) providing a digital autofocus camera module comprising a movable lens and an image sensor, and a measurement device;
   (2) performing an autofocus operation in at least three ROIs of an image field using an autofocus function of the camera;
   (3) tracking the lens positions at which the ROIs selected in previous step reach their maximum sharpness values using sharpness metrics, wherein said sharpness values are determined using one of Sobel values or standard deviation blur values;
   (4) calculating a tilt of the image sensor using geometric transformation based on the lens positions yielding the maximum sharpness values found in previous step; and
   (5) correcting the tilt of image sensor based on tilt information found in previous step.

9. The method of claim 8 wherein the tilt information comprises values of pitch and yaw deviations.

10. The method of claim 8 wherein a one-frame tilt measurement is repeated after the image sensor has been aligned.

11. The method of claim 8 wherein said geometric transformation comprises:
    (1) defining a vector for each of the ROIs defining a distance between the ROI and a sensor center and defining a best sharpness lens-sensor distance;
    (2) calculate a cross vector product of a diagonal axis differences of the 5 vectors; and
    (3) calculating pitch and yaw angles using the cross vector product.

12. The method of claim 8 wherein more than one of the ROIs are located in corners of the image sensor.

13. A method for cameras to gain tilt information of an image sensor of a camera in order to correct for this tilt, comprising the following steps:
    (1) providing a digital camera module comprising a movable lens and an image sensor, and a measurement device;
    (2) performing an autofocus operation on a center of an image field;
    (3) performing a sweep of a lens position around an autofocus position found in previous step, wherein a range of said sweep is selected according to a typical maximal physical tilt observed;
    (4) measuring sharpness in at least three ROIs of the image field;
    (5) tracking the lens positions at which the ROIs selected in previous step reach their maximum sharpness values using sharpness metrics;
    (6) calculating a tilt of the image sensor using geometric transformation based on the lens positions yielding the maximum sharpness values found in previous step;
    (7) correcting the tilt of image sensor based on tilt information found in previous step; and
    (8) repeating a one-frame tilt measurement after the image sensor has been aligned.

* * * * *